United States Patent
Janisiow

(10) Patent No.: US 11,021,262 B2
(45) Date of Patent: Jun. 1, 2021

(54) UNLOCKING APPARATUS FOR A RAM AIR TURBINE ACTUATOR

(71) Applicant: Hamilton Sundstrand Corporation, Charlotte, NC (US)

(72) Inventor: Tomasz Janisiow, Olawa (PL)

(73) Assignee: Hamilton Sundstrand Corporation, Charlotte, NC (US)

( * ) Notice: Subject to any disclaimer, the term of this patent is extended or adjusted under 35 U.S.C. 154(b) by 77 days.

(21) Appl. No.: 16/577,135

(22) Filed: Sep. 20, 2019

(65) Prior Publication Data

US 2020/0079523 A1 Mar. 12, 2020

Related U.S. Application Data

(63) Continuation of application No. 15/368,209, filed on Dec. 2, 2016, now abandoned.

(30) Foreign Application Priority Data

Dec. 4, 2015 (EP) ..................... 15461580

(51) Int. Cl.
| | |
|---|---|
| *F16H 21/44* | (2006.01) |
| *F16H 21/54* | (2006.01) |
| *F16H 25/18* | (2006.01) |
| *B64D 41/00* | (2006.01) |

(52) U.S. Cl.
CPC .......... *B64D 41/007* (2013.01); *F16H 25/18* (2013.01)

(58) Field of Classification Search
CPC .. B64D 41/007; E05B 7/0004; E05B 47/0002
See application file for complete search history.

(56) References Cited

U.S. PATENT DOCUMENTS

| | | | |
|---|---|---|---|
| 3,584,544 | A | 6/1971 | Haberman |
| 4,392,556 | A | 7/1983 | Deutsch |
| 6,948,685 | B2 | 9/2005 | Hawthorne |
| 7,707,924 | B2 | 5/2010 | Yamanouchi et al. |
| 8,640,563 | B2 | 2/2014 | Lang et al. |
| 9,399,522 | B2 | 7/2016 | Bannon |
| 2013/0327207 | A1 | 12/2013 | Sasscer et al. |

FOREIGN PATENT DOCUMENTS

| | | |
|---|---|---|
| EP | 1380714 A2 | 1/2004 |
| EP | 1626142 A2 | 2/2006 |

OTHER PUBLICATIONS

Extended European Search Report dated Apr. 20, 2016, issued during the prosecution of European Patent Application No. EP 15461580.1 (7 pages).

*Primary Examiner* — Jake Cook
(74) *Attorney, Agent, or Firm* — Locke Lord LLP; Scott D. Wofsy; Joshua L. Jones

(57) ABSTRACT

An apparatus for unlocking an actuator comprises a first member mounted in a housing for longitudinal movement along an axis. A recess is formed in a surface of the first member. The apparatus further comprises a second member for operative connection to a lock release element of an actuator for movement in a direction generally transverse to the axis of movement of the first member. The second member has a follower element resiliently biased into contact with the surface of the first member. The apparatus further comprises an unlocking actuator for moving the first member along the axis between a first, locking position in which the follower element engages the surface and a second, unlocking position in which the follower element is at least partially received within the recess.

15 Claims, 5 Drawing Sheets

UNLOCKING APPARATUS FOR A RAM AIR TURBINE ACTUATOR

CROSS-REFERENCE TO RELATED APPLICATIONS

This application is a continuation of U.S. patent application Ser. No. 15/368,209 filed Dec. 2, 2016, which claims priority under 35 U.S.C. § 119(e) to European Application No. 15461580.1 filed Dec. 4, 2015, the contents of which are incorporated herein by reference in their entirety.

TECHNICAL FIELD

This disclosure relates to unlocking apparatus and in particular to an unlocking apparatus for an actuator, more particularly, but not exclusively, a ram air turbine (RAT) actuator.

BACKGROUND

Ram air turbines are used in aircraft to provide electric and/or hydraulic power to components of the aircraft, for example in the event of failure of other electrical or hydraulic power generating equipment on board the aircraft. In normal operation of the aircraft, the RAT is housed within the aircraft, but when needed it is extended into the airflow around the aircraft such that it may turn and generate electrical and/or hydraulic power. The RAT is typically pivoted into position by means of an actuator, for example a hydraulic actuator. The actuator typically includes a piston which extends to deploy the RAT. The actuator has a lock mechanism which prevents inadvertent movement of the piston and thus inadvertent deployment of the RAT. The locking mechanism typically comprises a spring loaded lock piston which must be moved in an axial direction to unlock the actuator. Such a mechanism is disclosed for example in US 2013/0327207 A1.

An unlocking mechanism is provided to permit this movement. Typically, the unlocking mechanism comprises a two link, knee type linkage, one end of which is rotatably coupled to one end of the locking piston and the other end of which is axially fixed and rotatably coupled to a support. A linear solenoid moves the linkage between a locked and an unlocked position. However, in moving between the two positions, the linkage must go "over centre" and initially displace the lock piston against the force of the lock piston spring, which means that a relatively large solenoid may be necessary.

As weight is of concern in aircraft, it would be desirable to provide a locking mechanism which may potentially be lighter

SUMMARY

Disclosed herein is an apparatus for unlocking an actuator, the apparatus comprising:
  an unlocking member mounted in a housing for longitudinal movement along an axis and having a surface having a recess formed therein; and
  an unlocking actuator for moving the first member along the axis between a first, locking position in which a follower element of a second member for operative connection to a lock release element of an actuator and biased for movement in a direction generally transverse to the axis of movement of the first member may engage the surface and a second, unlocking position in which the follower element may be at least partially received within the recess.

The unlocking member may be generally cylindrical in shape, whereby the surface of the first member may be generally cylindrical in shape. The cylindrical shape may have a generally circular cross section.

The recess may comprise a circumferentially extending groove in the surface of the unlocking member.

A pair of recesses separated by a section of the unlocking member surface may be provided.

The unlocking member may be spring biased into its first position by one or more springs, for example one or more coil springs. The coil spring may be mounted around a portion of the first member.

In a first embodiment, the unlocking member may be provided with a circumferentially extending flange, and the spring be arranged between the flange and a fixed part.

In certain embodiments, a pair of flanges may be provided at opposed end portions of the unlocking member.

In some embodiments, a pair of unlocking actuators may be provided for moving the unlocking member.

The unlocking actuator or actuators may be a solenoid or solenoids.

The unlocking member may be mounted in a bore of the housing, and the solenoid or solenoids mounted around the unlocking member to support the unlocking member in the housing.

The unlocking member may be substantially symmetrical about a central transverse axis.

The apparatus may further include the second member.

The disclosure therefore also provides an apparatus for unlocking an actuator, the apparatus comprising:
  a first, unlocking member mounted in a housing for longitudinal movement along an axis and having a recess formed in a surface thereof; a second member for operative connection to a lock release element of an actuator for movement in a direction generally transverse to the axis of movement of the first member and having a follower element resiliently biased into contact with the surface of the first member; and
an unlocking actuator for moving the first member along the axis between a first, locking position in which the follower element engages the surface and a second, unlocking position in which the follower element is at least partially received within the recess.

The follower element of the second member may be a roller.

The apparatus may further comprise a biasing spring for biasing the follower element into contact with the unlocking member.

The disclosure also extends to an actuator comprising an unlocking apparatus as described above.

The actuator may comprise a locking rod axially movable between a locking and an unlocking position, and the second member of the locking apparatus may be coupled to an end of the locking rod such that movement of the follower element of the second member into the recess of the unlocking member allows the locking rod to move to its unlocking position.

The actuator may further comprise a spring for biasing the locking rod towards the unlocking member, that spring providing the biasing for the second member.

The actuator may be a ram air turbine actuator.

The disclosure also extends to a method of unlocking an actuator comprising moving a first, unlocking member along an axis from a first position in which a follower element of a second member coupled to the actuator and biased into engagement with the first member engages a surface of the first member and a second position in which the follower element is at least partially received within a recess in the surface of the first member.

BRIEF DESCRIPTION OF THE DRAWINGS

A non-limiting embodiment of this disclosure will now be described by way of example only with reference to the accompanying drawings in which.

DETAILED DESCRIPTION

Figure 1:
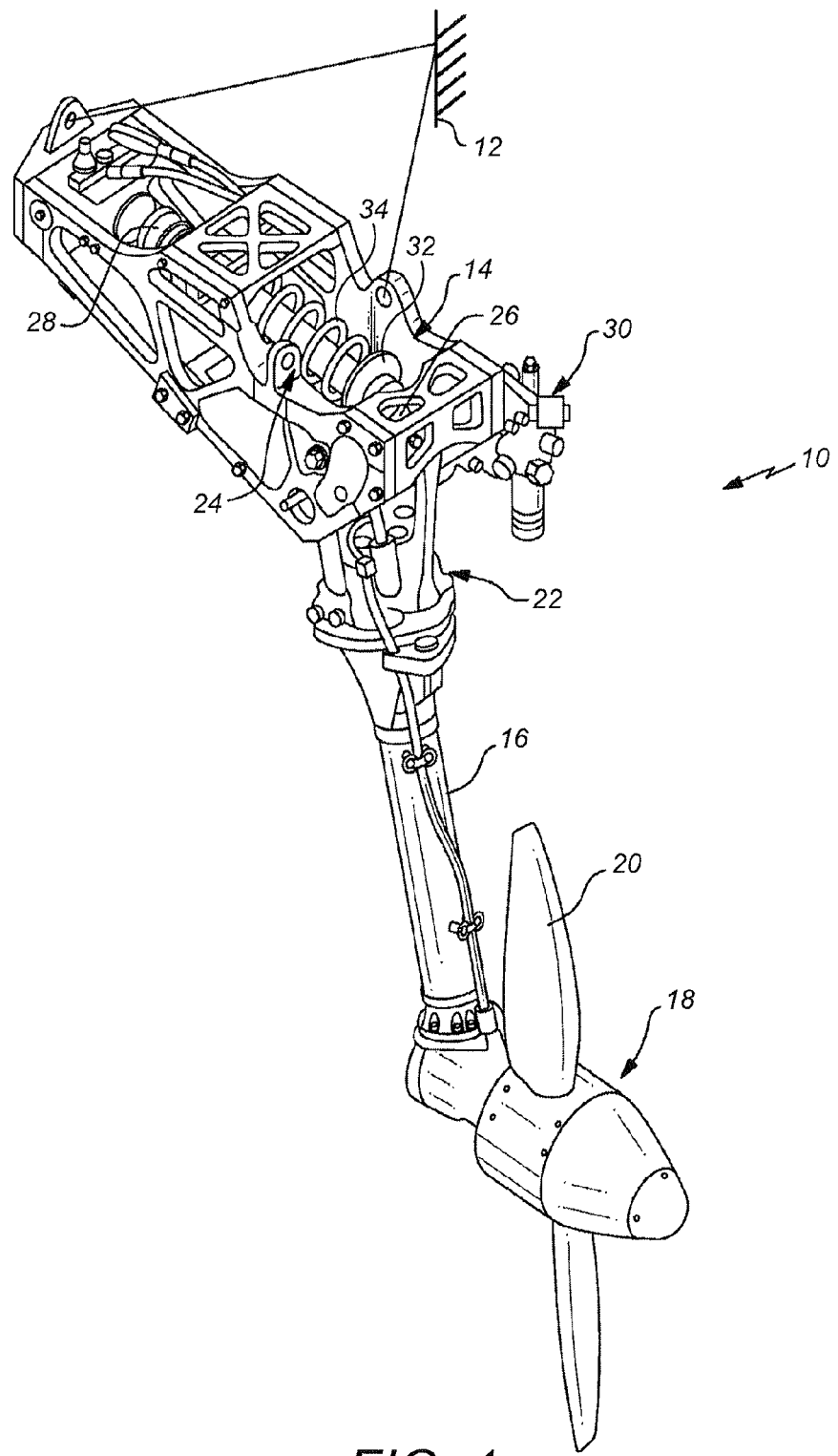
FIG. 1 illustrates a ram air turbine (RAT)

FIG. 1 illustrates an RAT system 10 which is secured to an aircraft structure 12 by a housing 14. The housing 14 pivotally supports a strut 16 having a turbine 18 at one end. The turbine 18 includes blades 20, which impart rotational drive to a generator 22 and hydraulic pump 30 for example. An actuator 24 is secured to the strut at a first end 26 and to the housing at a second end 28. The actuator 24 is illustrated in its deployed position.

The actuator 24 comprises a cylinder 32 which is biased by a spring 34 in order to deploy the strut 16. When the cylinder 32 is retracted, it is held in its retracted position by means of a locking mechanism, details of which will be described further below.

Figure 2:
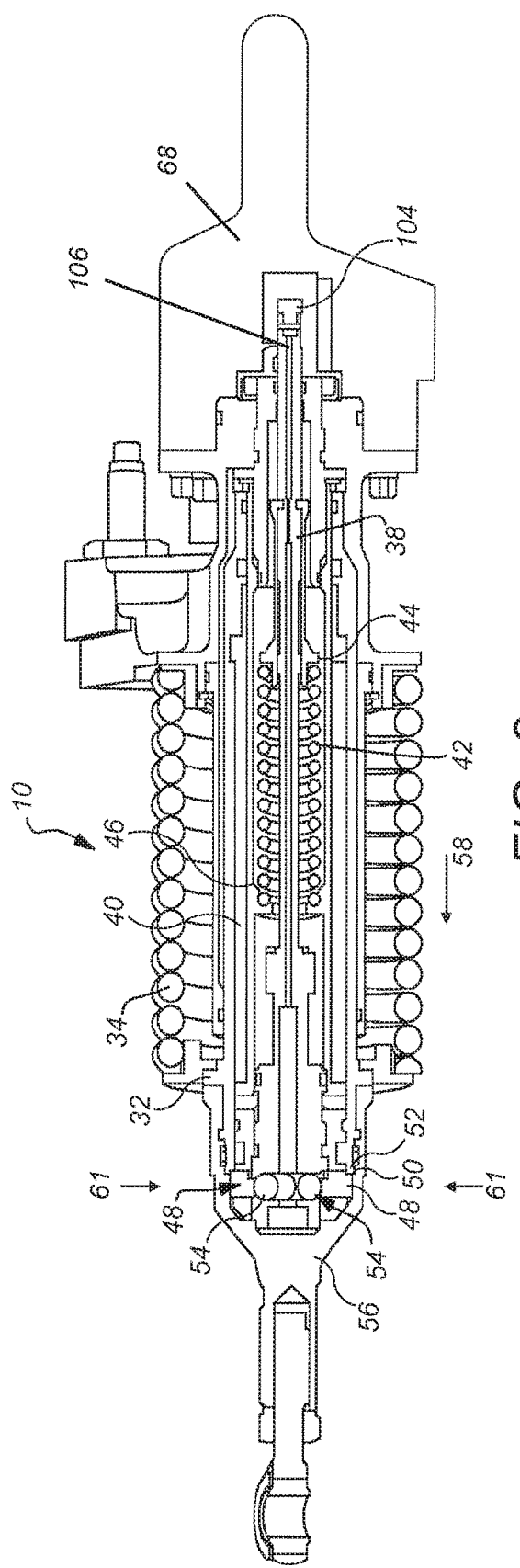
FIG. 2 illustrates a partial view of a locking mechanism for a RAT actuator.

With reference to FIG. 2, the locking mechanism comprises a locking piston or bolt 38 which is received slidably within a sleeve 40. The locking piston 38 is biased to the right in the sense of FIG. 2 by means of a biasing spring 42 which extends between a seat 44 provided on the locking piston 38 and a seat 46 provided on the sleeve 40.

The extensible cylinder 32 of the actuator is slidably mounted around the sleeve 40. Extension of the cylinder 32 is prevented by locking elements 48 mounted at the end of the sleeve. In the locking position, respective shoulders 50, 52 of the cylinder 32 and locking wedges 48 engage to prevent axial movement of the cylinder 32.

A number of rollers 54 are mounted in the distal end 56 of the locking piston 38. However, it will be noted that when the locking piston 38 is moved to the left in a direction of arrow 58, the wedges 48 may displace in the direction of arrows 61 thereby disengaging the shoulders 50, 52 and allowing the cylinder 32 to extend to deploy the RAT.

This unlocking movement of the locking piston 38 is made possible by means of an unlocking apparatus 60 which will be described with reference to FIGS. 3 to 5.

The apparatus 60 comprises a first, unlocking member 62 and a second member 64. The first member 62 is mounted for longitudinal movement along an axis A in a bore 66 of a housing 68. The housing 68 will be fixed in a suitable manner to the housing of the actuator 24. It should be noted that the term "member" as used herein is not limited to unitary elements, and embraces both unitary elements and assemblies.

The apparatus 60 further comprises a pair of unlocking actuators 70, 72, in this embodiment in the form of solenoid actuators 70, 72, which are fixedly mounted, for example press fit, in respective counterbores 74, 76 in the housing 68 around the first member 62. As will be described further below, the solenoid actuators 70, 72 move the first member 62 between first and second longitudinal positions relative to the housing 68. The solenoid actuators 70, 72 are arranged to provide a movement of the first member 62 in the same direction. One solenoid actuator in effect acts as a back up for the other to provide a degree of redundancy in the system. In some embodiments, where safety may not be of such a concern, only one solenoid actuator 70, 72 need be provided.

As can be seen, the first member 62 is a generally cylindrical shaft member having a longitudinally extending surface 78. In this embodiment, the first member 62 is generally circular in cross section, but other shaft cross sections may be used in accordance with the disclosure.

The longitudinally extending surface 78 comprises two end surface portions 82, 84 which are received within the respective solenoids 70, 72 and by which the first member 62 are supported in the housing bore 66. Of course in other embodiments, the member 62 may be supported by other means. However, using the solenoids 70, 72 will potentially be more cost effective and allow better control of tolerances. The first member 62 further comprises a pair of circumferentially extending flanges 86, 88 which extend radially outwardly from the inner end of the respective end surface portions 82, 84.

Arranged between the flanges 86, 88 are a pair of recesses in the form of circumferentially extending annular grooves 90, 92 which are separated by an intermediate, central longitudinally extending surface portion 94. As can best be seen from FIGS. 5A and 5B, the grooves 90, 92 are is formed such that there is a relatively abrupt, rather than gradual, transition between the intermediate longitudinally extending surface portion 94 and the grooves 90, 92. In this embodiment, the grooves 90, 92 extend completely around the circumference of the first member 62, but this is not essential.

It will be seen that in this embodiment, the first member 62 is substantially symmetrical about a central transverse axis. This is not essential, however, and it would be possible in other embodiments to provide just a single flange 86 and a single groove 92. However, by duplicating these features as shown, it may facilitate assembly of the apparatus as the apparatus will function properly whichever way around the first member 62 is mounted in the housing bore 66.

Figure 3:
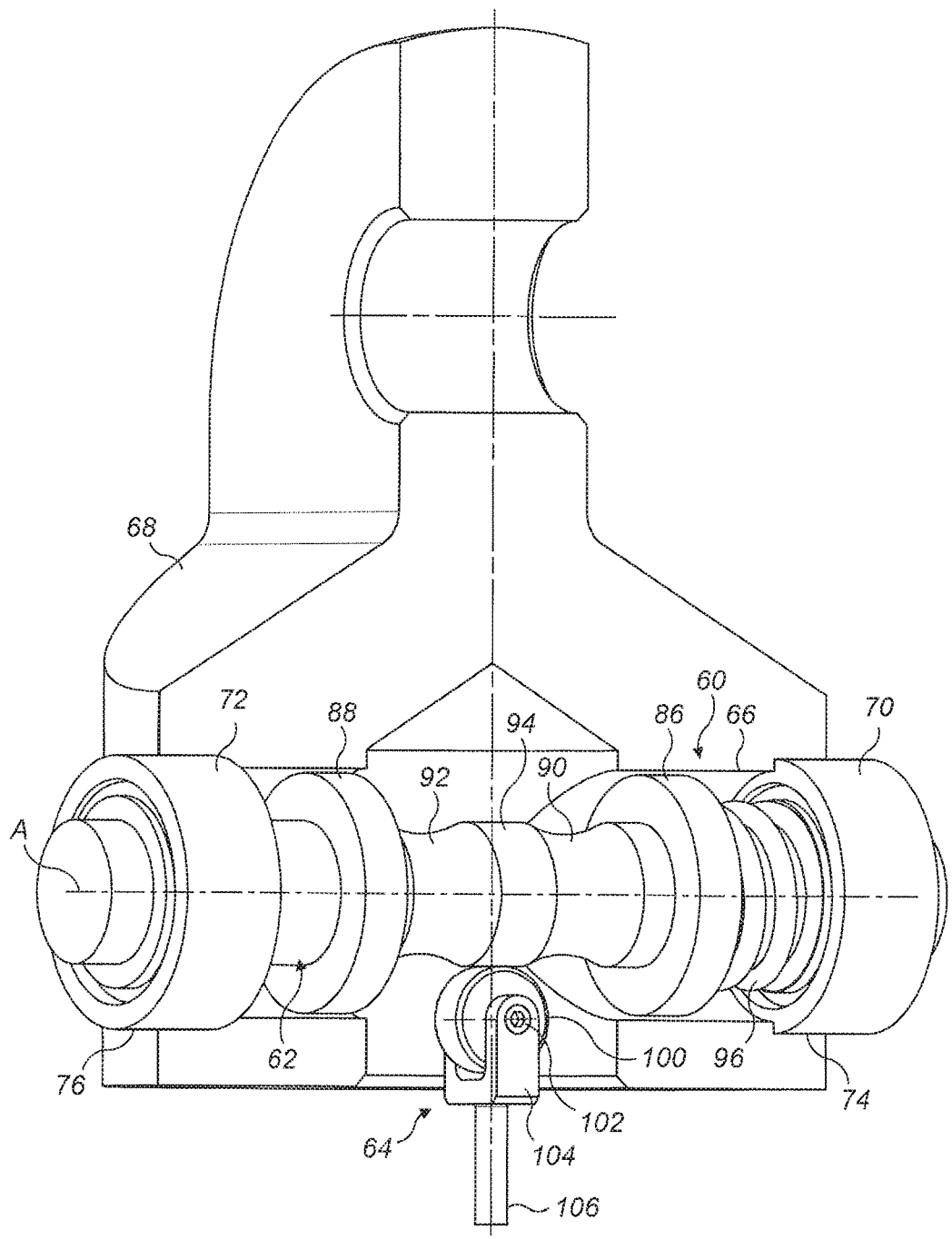
FIG. 3 shows a part cut away view of phantom perspective view of a further part of the locking mechanism.
Figure 4:
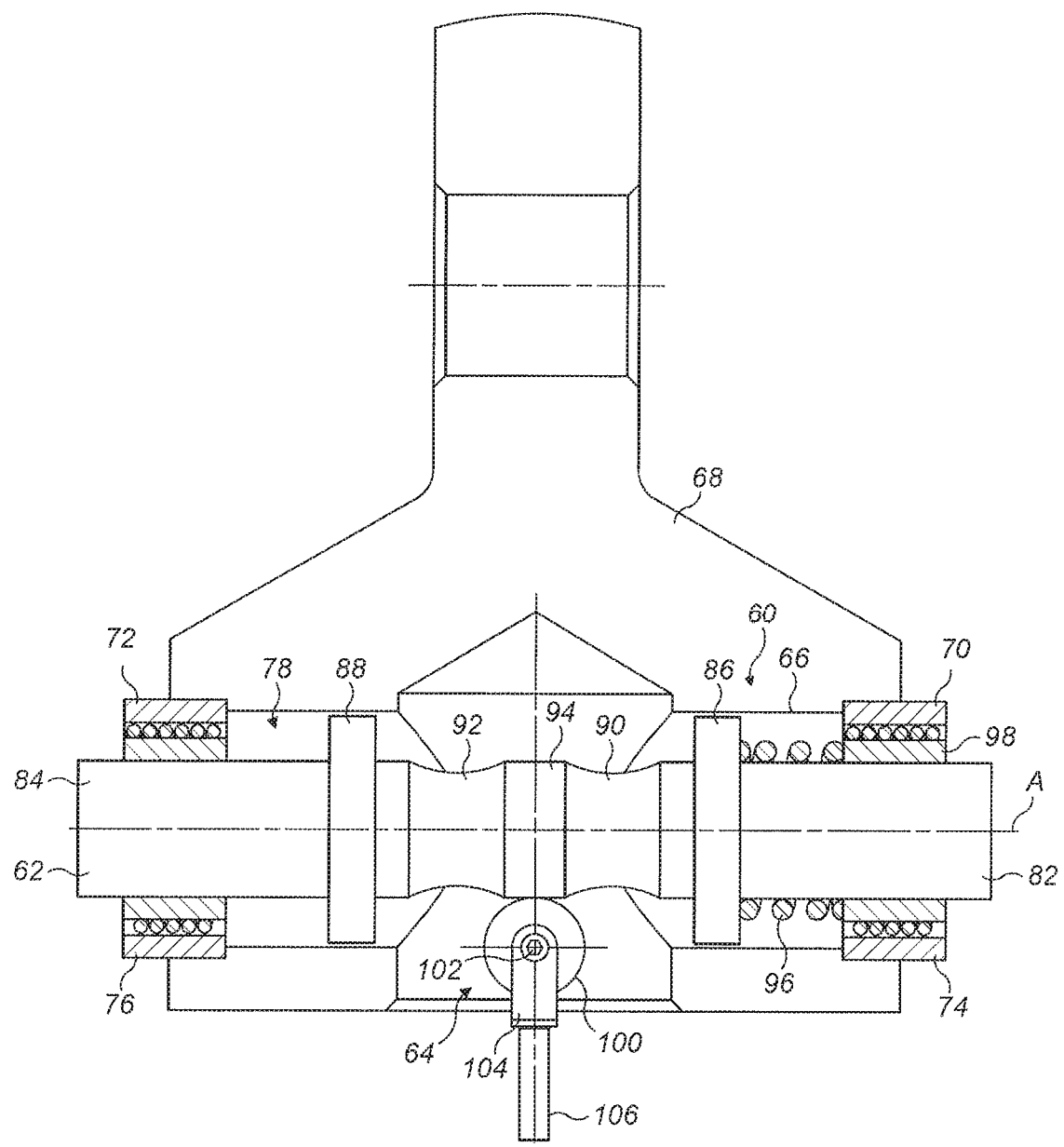
FIG. 4 shows a cross sectional view of the mechanism of FIG. 3.
Figure 5A:
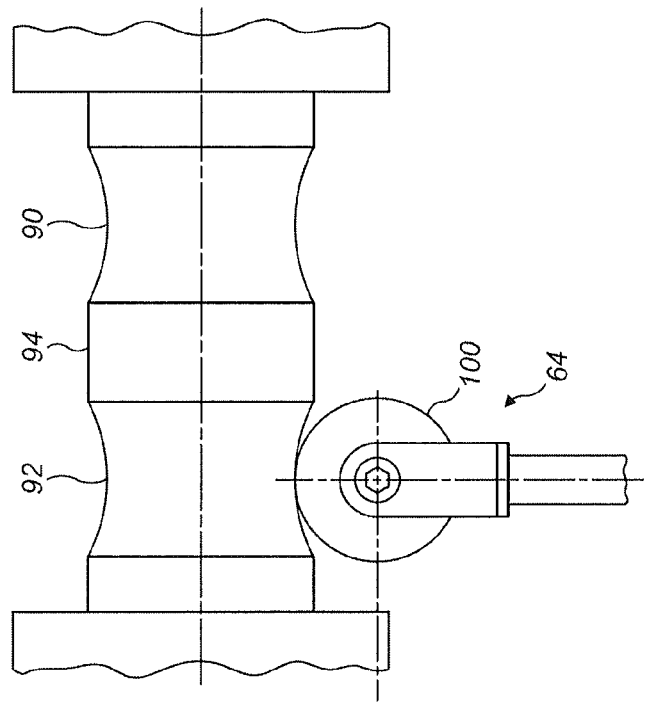
FIGS. 5A and 5B illustrate a schematic cross sectional view of the locking mechanism in locked and unlocked configuration respectively.
Figure 5B:
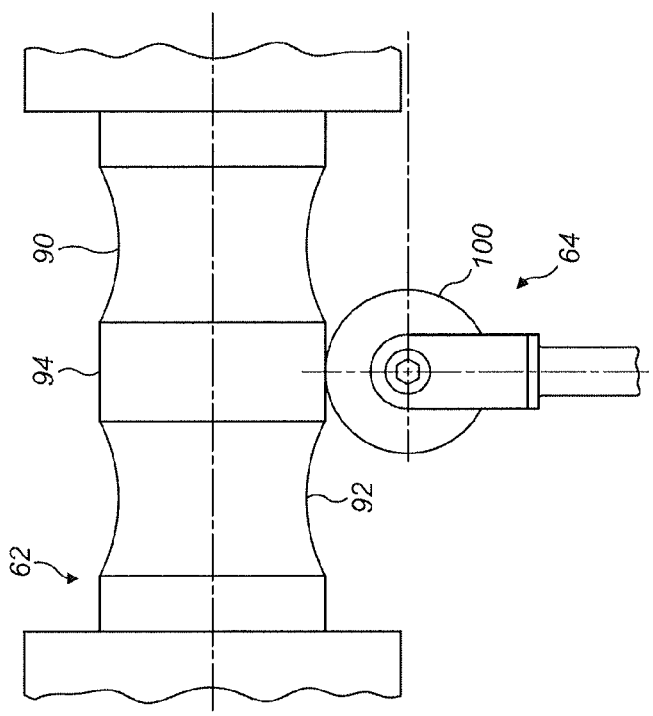

A biasing member, in this embodiment a coil spring 96, is arranged between one of the flanges 86 and an inner, fixed part 98 of the solenoid 72 and biases the first member 62 to the position shown in FIGS. 3, 4 and 5A. One or more stop members (not illustrated) may be provided to ensure that the first member does not overshoot the position. Of course in other embodiments, other forms of biasing spring may be provided.

The second member 64 comprises a follower element 100 in the form of a roller. The follower element 100 need not be a roller, but a roller may be advantageous in that it reduces frictional forces between the first and second members 62, 64. The roller 100 is rotatably supported on a shaft 102 supported by a yoke 104. A mounting pin or rod 106 extends from the yoke 104 and, as shown in FIG. 2, is mounted at one end of the locking piston 38. The follower 100 will therefore be biased into contact with the central surface portion 94 of the first member 62 by virtue of the biasing spring 42 of the locking mechanism 36.

The apparatus 60 may be assembled by inserting the first member 62, with the spring 96 arranged over end portion 82 into the housing bore 66 and then mounting the solenoids 70, 72 over the end portions 82, 84 of the first member and retaining the solenoids 70, 72 in the housing counterbores 74, 76 by suitable means.

Operation of the unlocking apparatus 60 will now be described.

FIGS. 3, 4 and 5A show the apparatus 60 in a locked position. In this position, the roller 100 of the second member 64 is resiliently biased against the central surface portion 94 of the first member 62 by means of the biasing spring 42 of the actuator 24.

When it is desired to unlock the actuator 24 to allow deployment of the strut 16, power is supplied to the unlocking actuators 70, 72. Both unlocking actuators 70, 72 produce a movement of the first member 62 in the same direction, namely to the right in the sense of FIG. 4. The first member 62 then moves against the force of the spring 96 towards the position shown in FIG. 5B so as to allow the roller 100 of the second member 62 to move along the central surface portion 94 and, under the biasing effect of actuator biasing spring 42, into the groove 92. Movement of the first member 62 beyond the position shown in FIG. 5B may be prevented by a stop (not shown). Since the transition between the groove 92 and the central surface portion 94 is relatively abrupt, the roller element 100 will move into the groove 92 relatively rapidly, allowing a rapid, rather than gradual, unlocking movement.

The movement of the second member 64 allows the locking piston 38 to move in an unlocking direction sufficiently to move the rollers 56 of the locking piston 38 out of alignment with the locking surfaces of the locking wedges 48, thereby allowing deployment of the actuator cylinder 32. It will be understood that compared to the prior art system discussed in the introduction, the only forces which need to be overcome in order to effect this unlocking are the biasing forces of the spring 96 and any frictional forces between the first and second members 62, 64. However, the use of a roller element 100 minimises frictional forces.

The relative forces of the actuator biasing spring 42 and the spring 96 on the first member 62 are such that when the power supply is discontinued to the solenoids 70, 72, the roller 100 remains engaged in the groove 92.

When the RAT is to be retracted, the lock piston 38 is moved in the opposite direction by suitable means so as to move the second member 64 away from the first member 62. Once the roller element 100 disengages from the recess 92, the coil spring 96 will return the first member 62 to the "locking" position in which the groove 92 is out of alignment with the roller element 74.

The above is a description of just a single exemplary embodiment. Modifications may be made to that embodiment without departing from the scope of this disclosure.

For example, to allow manual operation in the event of solenoid failure, a user may push on the end portion of the first member 62 via suitable means.

Also, as discussed above, another type of engagement between the first and second members 62, 64 may be used. In other embodiments, for example, the roller element 100 may be replaced by a low friction element which will slide, rather than roll, on the central surface portion 94 of the first member 62.

In addition, the apparatus may comprise just a single unlocking solenoid 72 where redundancy is not required, and the first member need only be provided with just a single flange 86 and groove 92.

Also, while the apparatus has been described in the context of unlocking a RAT actuator 24, it may find use in other unlocking applications, for example in applications where a relatively large actuator biasing force may have to be overcome to effect unlocking. Thus the disclosure should not be regarded as being limited to the particular application shown.

In contrast to the prior art "knee" arrangement described above, in the embodiments of this disclosure, an unlocking movement of a lock release element, for example a locking piston, can be achieved by translating a first member such that a portion of a second member moves at least partially into a recess formed in a surface of the first member. This avoids the displacement of the locking piston against the biasing force of its spring, allowing potentially a smaller and therefore lighter actuator to be used.

The embodiments also provide, a number of advantages over the prior art "knee" arrangement. Firstly, the apparatus may use substantially fewer, and less complex components. Moreover, precise shimming of the knee to ensure proper operation is not required, with greater tolerances being accommodated within the apparatus.

The invention claimed is:

1. An apparatus for unlocking an actuator, the apparatus comprising:
an unlocking member mounted in a housing for longitudinal movement along an axis and having a surface having a recess formed therein and a longitudinally extending surface portion; and
an unlocking actuator for moving the first member along the axis between a first, locking position in which a follower element of a second member for operative connection to a lock release element of an actuator and biased for movement in a direction generally transverse to the axis of movement of the first member engages the longitudinally extending surface portion and a second, unlocking position in which the follower element is at least partially received within the recess, wherein the follower is configured to follow movement of the unlocking member.

2. An apparatus as claimed in claim 1, wherein the unlocking member is generally cylindrical in shape.

3. An apparatus as claimed in claim 1, wherein the recess comprises a circumferentially extending groove in the surface of the first member.

4. An apparatus as claimed in claim 3, comprising a pair of recesses separated by a section of the surface of the unlocking member.

5. An apparatus as claimed in claim 1, comprising one or more springs, for example one or more coil springs, for biasing the unlocking member into its first position.

6. An apparatus as claimed in claim 5, wherein the first member further comprises a circumferentially extending flange, and wherein the spring is arranged between the flange and a fixed part.

7. An apparatus as claimed in claim 6, wherein the first member comprises a pair of flanges arranged on opposed end portions of the unlocking member.

8. An apparatus as claimed in claim 1, comprising a pair of unlocking actuators operable to move the unlocking member.

9. An apparatus as claimed in claim 1, wherein the unlocking actuator is a solenoid.

10. An apparatus as claimed in claim 1, wherein the unlocking member is mounted in a bore of the housing, and one or more solenoids are mounted around the unlocking member to support the unlocking member in the housing.

11. An apparatus as claimed in claim 1, further comprising the second member.

12. An apparatus as claimed in claim 11, wherein the follower element of the second member is a roller.

13. An actuator, comprising an unlocking apparatus as claimed in claim 11.

14. An actuator as claimed in claim 13, wherein the actuator comprises a locking rod axially movable between a locking and an unlocking position, and wherein the second member of the locking apparatus is coupled to an end of the locking rod such that movement of the follower element of the second member into the recess of the first member moves the locking rod to an unlocking position, and wherein the actuator further comprises a spring for biasing the locking rod towards the unlocking member, that spring providing the biasing for the second member.

15. A method of unlocking an actuator comprising: moving a first, unlocking member longitudinally along an axis from a first position in which a follower element of a second member coupled to the actuator is biased into engagement with a surface of the first member and a second position in which the follower element is at least partially received within a recess in the surface of the first member, wherein the follower is configured to follow movement of the unlocking member.

* * * * *